United States Patent
Jung et al.

(10) Patent No.: US 10,220,757 B2
(45) Date of Patent: Mar. 5, 2019

(54) LOADING AND UNLOADING DEVICE USING FORMATION OF SLOPE OF LOADING AND UNLOADING MAT

(71) Applicant: CJ KOREA EXPRESS CORPORATION, Seoul (KR)

(72) Inventors: Jae Sook Jung, Goyang-si (KR); Sung Yong Jung, Goyang-si (KR); Koo Po Kwon, Yongin-si (KR)

(73) Assignee: CJ KOREA EXPRESS CORPORATION, Seoul (KR)

( * ) Notice: Subject to any disclaimer, the term of this patent is extended or adjusted under 35 U.S.C. 154(b) by 0 days.

(21) Appl. No.: 15/518,593

(22) PCT Filed: Oct. 14, 2015

(86) PCT No.: PCT/KR2015/010822
§ 371 (c)(1),
(2) Date: Apr. 12, 2017

(87) PCT Pub. No.: WO2016/060459
PCT Pub. Date: Apr. 21, 2016

(65) Prior Publication Data
US 2017/0232879 A1    Aug. 17, 2017

(30) Foreign Application Priority Data
Oct. 14, 2014  (KR) .................. 10-2014-0138335

(51) Int. Cl.
*B60P 1/04* (2006.01)
*B65G 67/08* (2006.01)
*B60P 1/52* (2006.01)

(52) U.S. Cl.
CPC .................. *B60P 1/04* (2013.01); *B60P 1/52* (2013.01); *B65G 67/08* (2013.01)

(58) Field of Classification Search
CPC ...... B60P 1/04; B60P 1/52; B60P 1/38; B60P 1/006; B65G 67/08; B65G 69/08; B65G 35/04

See application file for complete search history.

(56) References Cited

U.S. PATENT DOCUMENTS 1,088,100 A * 2/1914 Saunders ............... B60P 1/006
                                                    105/239
1,207,795 A * 12/1916 Riekenberg ........... B65G 67/08
                                                    294/74

(Continued)

FOREIGN PATENT DOCUMENTS

CN    101021152 A    8/2007
CN    202245398 U    5/2012

(Continued)

OTHER PUBLICATIONS

International Search Report for PCT/KR2015/010822 dated Dec. 23, 2015 citing the above reference(s).

(Continued)

*Primary Examiner* — Mark C Hageman
(74) *Attorney, Agent, or Firm* — Hauptman Ham, LLP (57) ABSTRACT

The present invention relates to a device for loading and unloading loads, and more particularly, to a device for loading and unloading loads which includes a loading and unloading mat disposed inside a carrying box and a driving shaft connected with one end or both ends of the loading and unloading mat to carry out a rolling motion so that the loading and unloading mat forms a slope by operation of the driving shaft, thereby naturally loading and unloading the loads along the slope.

12 Claims, 4 Drawing Sheets

(56) References Cited

U.S. PATENT DOCUMENTS

| | | | | |
|---|---|---|---|---|
| 3,443,703 | A | | 5/1969 | Matsumoto |
| 3,471,037 | A | * | 10/1969 | McWilliams .......... B65G 67/08 |
| | | | | 414/792.6 |
| 3,856,354 | A | * | 12/1974 | Davis ........................ B60P 1/04 |
| | | | | 280/490.1 |
| 4,277,220 | A | * | 7/1981 | Wiley ..................... B60P 1/006 |
| | | | | 296/100.01 |
| 4,314,788 | A | * | 2/1982 | Williams ............... B65D 88/62 |
| | | | | 298/1 B |
| 4,470,749 | A | * | 9/1984 | Koudstaal ................. B60P 1/38 |
| | | | | 222/392 |
| 4,629,390 | A | * | 12/1986 | Burke ........................ B60P 1/38 |
| | | | | 15/256.5 |
| 4,892,456 | A | * | 1/1990 | Hodgetts ................... B60P 1/38 |
| | | | | 198/499 |
| 5,156,518 | A | * | 10/1992 | VanMatre ............... B60P 1/006 |
| | | | | 414/507 |
| 5,295,779 | A | * | 3/1994 | Mihalich ................ B65G 67/24 |
| | | | | 414/395 |
| 5,573,365 | A | * | 11/1996 | Michalski ................ B60J 7/085 |
| | | | | 414/416.09 |
| 6,033,179 | A | * | 3/2000 | Abbott ...................... B60P 1/00 |
| | | | | 414/527 |
| 6,974,296 | B2 | * | 12/2005 | Simrin ...................... B60P 1/00 |
| | | | | 414/525.1 |
| 8,454,095 | B1 | | 6/2013 | Dilts et al. |

FOREIGN PATENT DOCUMENTS

| | | |
|---|---|---|
| JP | 09-002139 A | 1/1997 |
| KR | 20-0281246 Y1 | 7/2002 |
| KR | 10-2010-0018824 A | 2/2010 |
| KR | 10-2011-0112060 A | 10/2011 |
| KR | 10-2011-0139614 A | 12/2011 |

OTHER PUBLICATIONS

Chinese Office Action dated Aug. 22, 2018, in connection with the Chinese Patent Application No. 201580055132.7 citing the above reference(s).

* cited by examiner

LOADING AND UNLOADING DEVICE USING FORMATION OF SLOPE OF LOADING AND UNLOADING MAT

CROSS REFERENCE TO RELATED APPLICATION

This application is a National Phase Application of PCT International Application No. PCT/KR2015/010822, which was filed on Oct. 14, 2015, and which claims priority from Korean Patent Application No. 10-2014-0138335, filed with the Korean Intellectual Property Office on Oct. 14, 2014. The disclosures of the above patent applications are incorporated herein by reference in their entirety.

TECHNICAL FIELD

The present invention relates to a device for loading and unloading loads, and more particularly, to a device for loading and unloading loads which includes a loading and unloading mat disposed inside a carrying box and a driving shaft connected with one end or both ends of the loading and unloading mat to carry out a rolling motion so that the loading and unloading mat forms a slope by operation of the driving shaft, thereby naturally loading and unloading the loads along the slope.

BACKGROUND ART

With a great development of parcel delivery service business which provides convenience in orders and receipt of goods, there are constant efforts to reduce unnecessary expenses and waste of time during the process to carry goods through a parcel delivery service.

The processes of loading and unloading goods on transportation means are big parts of the whole process of transportation, and so, many transport service agents have made many efforts to improve the processes more effectively.

In the meantime, lots of ideas to improve the process of unloading goods have been proposed. Of the ideas, Korean Patent Publication No. 10-2010-0018824 discloses a device which makes a slope between an entrance of a carrying box and an external conveyer to let loads be unloaded naturally along the slope when loads are unloaded.

However, such an unloading device can move the loads just between the entrance of the carrying box and the conveyer but loads located inside the carrying box must be pushed to the entrance of the carrying box with manpower. That is, in order to unload the loads more easily, a method which can move loads out of the carrying box from the inside of the carrying box is required.

The present invention relates to a device for loading and unloading loads which requires less manpower and time than conventional unloading devices. The loading and unloading device forms a slope inside the carrying box so that loads can naturally slide down out of the carrying box along the slope.

As described above, the present invention is to improve the process of loading and unloading the loads, and is proposed to satisfy the technical requirements described above and to provide additional technical elements that those skilled in the art cannot invent easily.

DISCLOSURE OF INVENTION

Technical Problem

Accordingly, the present invention has been made in an effort to solve the above-mentioned problems occurring in the prior arts, and it is an object of the present invention to provide a device for loading and unloading loads which includes shafts with different heights disposed on an inner wall of a front face and on an inner wall of a rear face of a carrying box and a loading and unloading mat connected to the shafts in such a way that the loading and unloading mat forms a slope when the shafts are operated, so that loads can be loaded and unloaded along the slope.

Another object of the present invention is to provide a device for loading and unloading loads which includes a loading and unloading mat conveyed when two shafts are operated in the same direction after the loading and unloading mat forms a slope, thereby easily loading and unloading loads.

A further object of the present invention is to provide a device for loading and unloading loads which includes shafts disposed inside a carrying box and freely controlled in their height, thereby allowing a user to change an inclination angle of the loading and unloading mat according to the user's intention.

A still further object of the present invention is to provide a device for loading and unloading loads which includes a hopper-shaped linkage part for connecting an entrance of the carrying box and an external conveyer with each other, thereby preventing that the loads sliding down along the slope deviate a moving route.

Solution to Problem

To achieve the above objects, in an aspect of the present invention, the present invention provides a device for loading and unloading loads including: a driving shaft which is disposed on an inner wall of an upper part of a front face or a lower part of a rear face of a carrying box, is connected with an end of a loading and unloading mat and carries out a rolling motion; and a fixed shaft which is disposed on the inner wall of the lower part of the rear face or the upper part of the front face corresponding to the position of the driving shaft and is connected with the other end of the loading and unloading mat.

Moreover, the loading and unloading mat forms a slope depending on the rolling motion of the driving shaft.

Furthermore, the driving shaft or the fixed shaft is controlled in its height.

Additionally, the loading and unloading device according to the present invention further includes height sensing means for preventing that loads exceed a loaded height.

In another aspect of the present invention, there is a device for loading and unloading loads including: a first driving shaft which is disposed on an inner wall of an upper part of a front face of a carrying box, is connected with an end of a loading and unloading mat and carries out a rolling motion; and a second driving shaft which is disposed on an inner wall of a lower part of a rear face of the carrying box, is connected with the other end of the loading and unloading mat, and carries out a rolling motion.

Moreover, the loading and unloading mat forms a slope depending on the rolling motion of at least one of the first driving shaft and the second driving shaft.

Furthermore, the first driving shaft and the second driving shaft carry out the rolling motion in the same direction to convey the loading and unloading mat after the loading and unloading mat forms the slope.

Additionally, the first driving shaft or the second driving shaft is controllable in its height.

In addition, the loading and unloading mat gets in close contact with at least one of the front face and the rear face of the inner wall of the carrying box.

Moreover, the loading and unloading device according to the present invention further includes an adhesive pad which is disposed on at least one of the front face and the rear face of the inner wall of the carrying box and is adhered with some of a bottom face of the loading and unloading mat.

Furthermore, the loading and unloading mat includes a plurality of protrusions formed on the surface thereof.

Additionally, the loading and unloading device according to the present invention further includes a linkage part whose one end extends from the bottom face of the rear of the inner wall of the carrying box and whose the other end is connected with a conveyer.

Advantageous Effects of Invention

The present invention can reduce manpower and expenses because it automates the process of moving the loads to the entrance of the carrying box.

Moreover, the present invention allows a user to directly control the inclination of the loading and unloading mat according to loading and unloading environments because the user can control the height of the driving shaft as the user intends.

Furthermore, the present invention can move the loads more easily because the two driving shafts are disposed inside the carrying box and the loading and unloading mat operates the driving shafts in the same direction after the flat slope is formed.

Additionally, the present invention can move the loads without deviation from the route when the loads slide down along the loading and unloading mat because the loading and unloading device includes the linkage part which is extended from the entrance of the carrying box and is connected to the device.

MODE FOR THE INVENTION

The above and other objects, technical configuration, features and advantages of the present invention will be apparent from the following detailed description of the preferred embodiments of the invention in conjunction with the accompanying drawings. Reference will be now made in detail to the preferred embodiments of the present invention with reference to the attached drawings.

It will be understood that the present description is not intended to limit the invention to those exemplary embodiments. It is obvious by those skilled in the art that the invention is intended to cover not only the exemplary embodiments, but also various alternatives, modifications, equivalents and other embodiments. Therefore, it will be understood that the embodiments described in the detailed description of the present invention are all exemplary to describe the present invention well and is not intended to limit the scope of the present invention to the exemplary embodiments.

It will be further understood that components described hereinafter are just examples for realizing the present invention. Therefore, the present invention may have different components without departing from the technical idea and scope of the present invention. Furthermore, the components of the present invention may be realized just by hardware or software, but may be realized in combination of various hardware and software parts which carry out the same functions.

It will be also understood that the terms of 'include' or 'have' in the specification are 'open type' expressions just to say that components exit and do not exclude additional components.

Additionally, it will be also understood that the expression that some component is 'connected' to another component means that some component is directly connected to another component or is connected to another component through a further component.

Hereinafter, referring to FIGS. 1 and 2, a device for loading and unloading loads according to a first preferred embodiment of the present invention.

Figure 1:
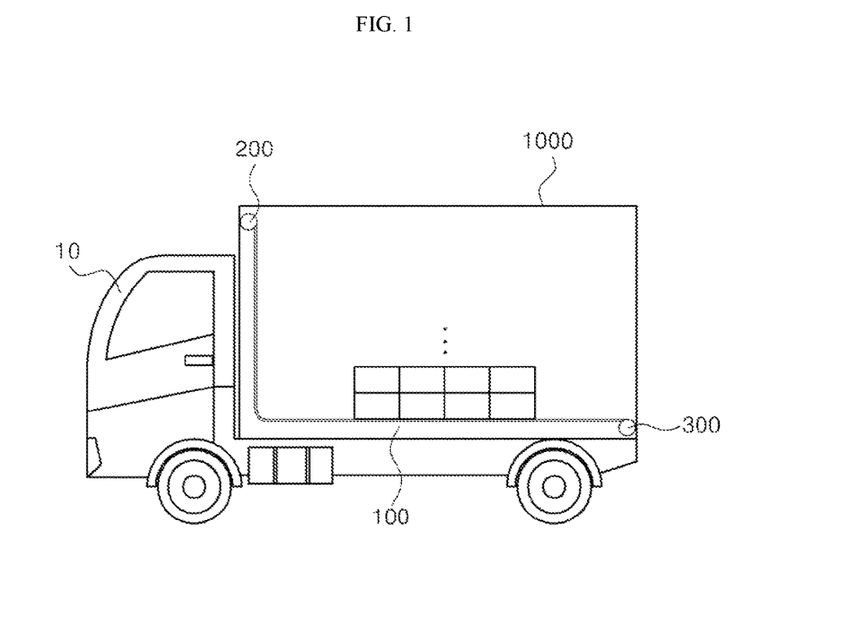
FIG. 1 is a schematic diagram showing a loading and unloading device according to a preferred embodiment of the present invention.

FIG. 1 illustrates a loading and unloading device according to a first preferred embodiment of the present invention. The loading and unloading device according to the present invention is a loading and unloading device mounted on transportation means 10. The loading and unloading device is generally disposed inside a carrying box 1000, and includes a loading and unloading mat 100, a fixed shaft 200 and a driving shaft 300.

First, the carrying box 1000 means a structure in which lots of things can be loaded. In this description of the present invention, inner walls of the carrying box 1000 are called a front face and a rear face, a top face and a bottom face and side faces on the basis of a progress direction of transportation means.

The carrying box 1000 may be mounted on the transportation means or an independent structure. For instance, it should be understood that the carrying box 1000 means a structure having a space for loading lots of things like an on-board carrying box of a truck which deliver goods.

The loading and unloading mat 100 is basically means on which loads are loaded and which moves the loads to an entrance of the carrying box 1000. It is preferable that the loading and unloading mat 100 be made of a material which is rollable by the driving shaft 300 and is as rigid as it can endure weight of the loads. In general, the loading and unloading mat 100 may be manufactured with a durable material, such as round sling, tarpaulin, PE water-repellent fabric and others.

Moreover, edges of the loading and unloading mat 100 are defined as a horizontal side (width direction) and a vertical side (length direction). The horizontal side of the loading and unloading mat 100 includes connecting means to be connected with the driving shaft 300 or the fixed shaft 200.

The connecting means may include various means, such as a plurality of rings, a press button and a zipper, and a user can connect the loading and unloading mat 100 with the driving shaft 300 as occasion demands.

In the meantime, the loading and unloading device according to the present invention includes the driving shaft 300 and the fixed shaft 200 mounted inside the carrying box 1000.

The driving shaft 300 is connected with one end of the loading and unloading mat 100, is a long shaft which is able to carry out a rolling motion, and internally includes a motor for the rolling motion. In this instance, the driving shaft 300 further includes a controller for controlling the motor, and the controller can control a rolling speed and a rolling period of time by receiving input from the user and carry out a torque control by a gear change.

Furthermore, the driving shaft 300 may be embodied to start or stop the rolling motion automatically according to the rolled length or the rolling period of time of the loading and unloading mat 100. For instance, the driving shaft 300 automatically stops the operation when the mat is rolled or unrolled to a predetermined length in consideration of the length of the loading and unloading mat 100 and the circumference of the cross section of the driving shaft. Alternatively, an identification indicator which is sensed by a sensor is mounted around an end of the loading and unloading mat 100, and the driving shaft 300 further includes the sensor for sensing the identification indicator, so that the driving shaft 300 automatically stops the operation when the sensor senses the identification indicator mounted at the end of the loading and unloading mat 100 during the rolling motion.

On the other hand, the driving shaft 300 can be operated by manpower, namely, manually. In this case, the driving shaft 300 includes a hand-grip for allowing the user to directly apply power, a gear for transferring driving power to the driving shaft, and a plurality of saw-toothed wheels for the gear.

In the meantime, the fixed shaft 200 is connected with the other end of the loading and unloading mat 100 and fixes the other end of the mat 100 when the mat 100 is rolled in by the rolling motion of the driving shaft 300, so that the loading and unloading mat 100 can form a flat plane. In this instance, the fixed shaft 200 and the driving shaft 300 carry out the rolling motion in the same direction.

Installation positions of the driving shaft 300 and the fixed shaft 200 can be complementarily decided inside the carrying box 1000. For instance, the fixed shaft 200 is mounted at a lower part of the rear face of the carrying box 1000 in a case that the driving shaft 300 is mounted at an upper part of the front face of the carrying box 1000, but is mounted at the upper part of the front face of the carrying box 1000 in a case that the driving shaft 300 is mounted at the lower part of the rear face of the carrying box 1000. That is, preferably, the driving shaft 300 and the fixed shaft 200 are mounted to form a slope lowering toward the entrance of the carrying box 1000 when the carrying box 1000 is viewed from the side.

In this instance, that the driving shaft 300 or the fixed shaft 200 is mounted at the upper part of the front face means that the driving shaft 300 or the fixed shaft 200 are mounted to be fixed utilizing the front face, the top face or both sides of the carrying box 1000. In the same way, that the driving shaft 300 or the fixed shaft 200 is mounted at the lower part of the rear face means that the driving shaft 300 or the fixed shaft 200 is mounted to be fixed utilizing the rear face, the bottom face or both sides of the carrying box 1000.

Now, an example that the loads are loaded and unloaded using the loading and unloading device having the loading and unloading mat 100, the driving shaft 300 and the fixed shaft 200 will be described in detail.

First, the user operates the driving shaft 300 before loading the loads so that the loading and unloading mat 100 is released to get in contact with the front face and the bottom face of the carrying box 1000. After the loading and unloading mat 1000 is released, the user loads the loads on the loading and unloading mat 100, and then, carries the loads to a destination.

In the meantime, when the user wants to unload the loads after arriving at the destination, the user operates the driving shaft 300 in the opposite direction to the case that the loads are loaded so that the loading and unloading mat 100 is rolled to the driving shaft in such a way that the rolled mat 100 forms a flat slope. In this instance, the loads on the loading and unloading mat 100 naturally slide down toward the entrance of the carrying box 1000 along the slope, and are finally conveyed by a conveyer 500 extended and connected to the entrance of the carrying box 1000.

Meanwhile, in a case that the carrying box 1000 is filled up with the loads, it may cause a problem that the loading and unloading mat 100 cannot form the slope. In order to solve the above-mentioned problem, a loaded height must be set to a specific height inside the carrying box 1000 to prevent that the loads exceed the loaded height.

The loading and unloading device according to the present invention may have height sensing means of various types disposed on the surface of the inner wall of the carrying box 1000 to prevent that the loads exceed the loaded height. For instance, an indication line may be marked at a specific height of the inner wall of the carrying box 1000. Moreover, the indication line may be embossed or intagliated to allow the user to tactually sense whether or not the loads exceed the loaded height. Furthermore, a sensor for sensing the height may be mounted inside the carrying box 1000. In this instance, the sensor may be one of various types, such as an inductive sensor, a capacitive sensor and a photo sensor for sensing positions of the loads. Additionally, when the height of the loads exceeds the predetermined height, a warning sound is generated to make the user recognize that the loads exceed the height.

Figure 2:
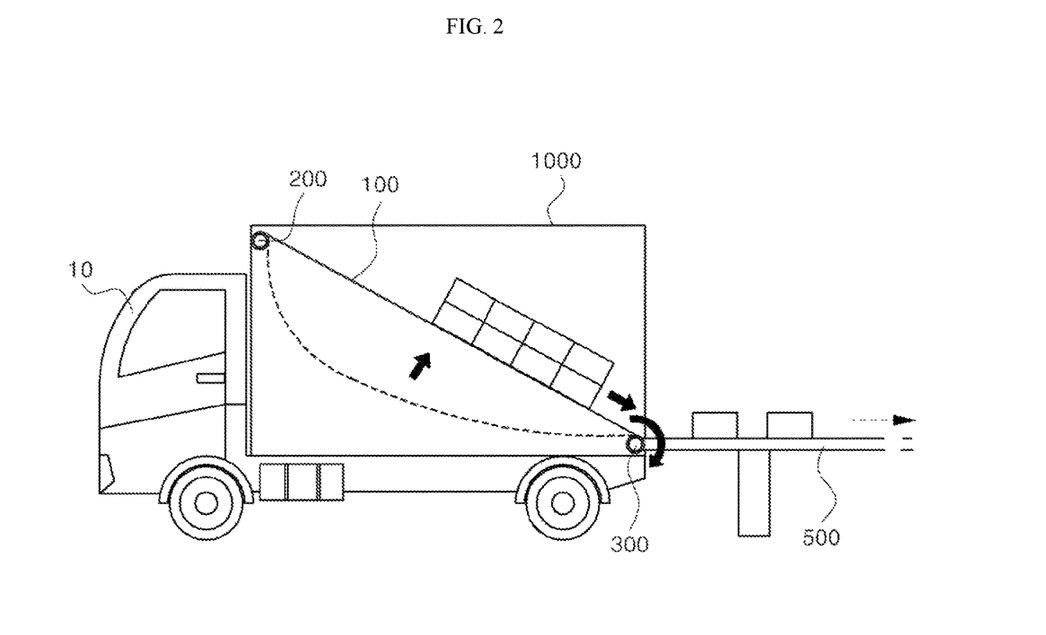
FIG. 2 is a view showing a state where the loading and unloading device according to the present invention is operated actually.

FIG. 2 illustrates a process that the loading and unloading mat 100 is rolled up by the driving shaft 300 to form the slope.

In this embodiment, preferably, the loading and unloading device is embodied to first unload the loads which are close to the rear face of the carrying box by operating the driving shaft 300 and the loading and unloading mat 100 forms the slope utilizing an available space inside the carrying box after some of the loads are unloaded.

In the meantime, the driving shaft 300 or the fixed shaft 200 disposed inside the loading and unloading device may be embodied to control the height as occasion demands. For instance, in a case that a guide rail is mounted on the surface of the inner wall of the carrying box 1000 to move each shaft along the guide rail, the user can control the height of the driving shaft 300 or the fixed shaft 200 according to weight and volume of the loads, inclination of a road surface and the height of the conveyer 500. When the height of the shaft is controlled, the degree of inclination of the loading and unloading mat 100 can be controlled, so that the user can convey the loads more safely and rapidly.

On the other hand, in order to move the loads more easily, namely, in order to reduce friction between the surface of the loading and unloading mat 100 and the loads, the loading and unloading mat 100 may have embossed or intagliated protrusions which are repeatedly formed on the surface of the mat 100. That is, in order to a friction area with the mat 100 when the loads slide along the slope, a plurality of the protrusions are repeatedly formed on the surface of the mat 100.

In the meantime, the protrusions may be formed in various shapes, such as polygons, circles and others when they are viewed flatwise.

Moreover, the protrusions may be directly formed on the surface of the mat 100 but may be formed on the mat 100 through various ways. An additional member may be attached to the mat 100, for instance, an element having protrusions may be adhered on the mat 100 or an air cushion may be adhered on the mat 100.

Hereinafter, referring to FIG. 3, a loading and unloading device according to a second preferred embodiment of the present invention will be described.

Figure 3:
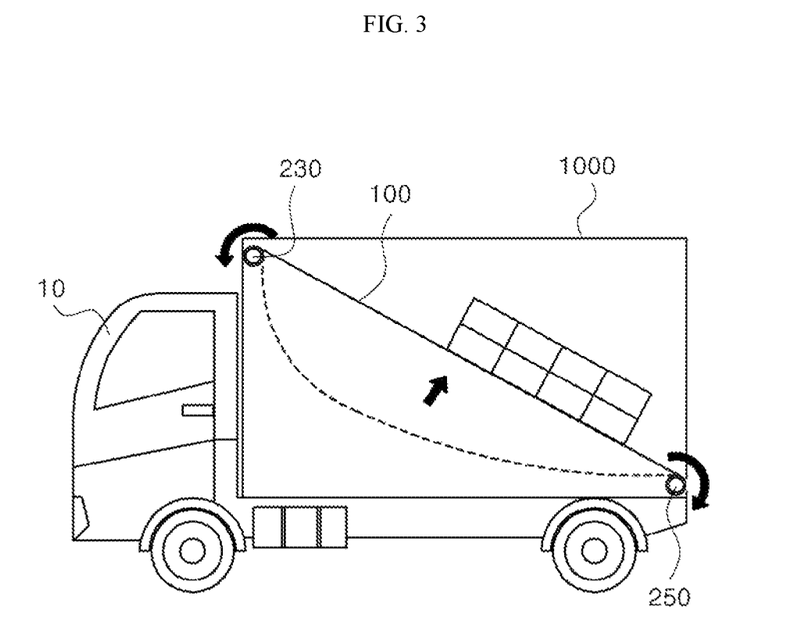
FIG. 3 is a view showing a loading and unloading device according to another preferred embodiment of the present invention.

The loading and unloading device shown in FIG. 3 basically has the configuration similar to the loading and unloading device shown in FIG. 1, but the loading and unloading device according to the second preferred embodiment is different from the loading and unloading device according to the first preferred embodiment in that the loading and unloading device has two driving shafts. That is, the loading and unloading device shown in FIG. 3 includes two driving shaft, namely, a first driving shaft 230 and a second driving shaft 250.

As shown in FIG. 3, the first driving shaft 230 is disposed on the inner wall of the upper part of the front face of the carrying box 1000 and is connected with an end of the loading and unloading mat 100. The second driving shaft 250 is disposed on the inner wall of the lower part of the rear face of the carrying box 1000 and is connected with the other end of the loading and unloading mat 100. In this instance, the method that the loading and unloading mat 100 is connected with each shaft is the same as the first preferred embodiment, its detailed description will be omitted.

As described above, that the first driving shaft 230 is mounted at the upper part of the front face means that the first driving shaft 230 is mounted to be fixed utilizing the front face, the top face or both sides of the carrying box 1000. In the same way, that the second driving shaft 250 is mounted at the lower part of the rear face means that the second driving shaft 250 is mounted to be fixed utilizing the rear face, the bottom face or both sides of the carrying box 1000.

A detailed example that the loads are loaded and unloaded using the loading and unloading device illustrated in FIG. 3 will be described.

First, when the loads are loaded, the user operates one of the first driving shaft 230 and the second driving shaft 250 to release the loading and unloading mat 100 to get in contact with the inner wall of the carrying box 1000, namely, the front face or the bottom face of the carrying box 1000. Alternatively, when the user operates the two driving shafts at the same time to release the loading and unloading mat 100. That is, in order to load the loads, the loading and unloading mat 100 gets in close contact with the inner wall of the carrying box 1000, and in this instance, the loading and unloading mat 100 is released by one or both of the driving shafts.

In the same way, when the loads are unloaded, the user operates at least one of the first driving shaft 230 and the second driving shaft 250 so that the loading and unloading mat 100 forms the slope.

In a case that the carrying box is fully filled with the loads, the loading and unloading device, preferably, operates the second driving shaft 250, and then, makes the loading and unloading mat 100 form the slope utilizing an available space inside the carrying box after some of the loads are unloaded.

In other words, in order to form the slope inside the carrying box 1000, the loading and unloading mat 100 must be pulled flatways by the rolling motion of the driving shaft connected to both ends of the loading and unloading mat 100, and in this instance, the rolling motion may be achieved by one of the first driving shaft 230 and the second driving shaft 250 or by the two driving shafts. For instance, in a case that only the first driving shaft 230 carries out the rolling motion, the second driving shaft 250 is in a stationary state, but in a case that only the second driving shaft 250 carries out the rolling motion, the first driving shaft 230 is in the stationary state. However, in a case that all of the first driving shaft 230 and the second driving shaft 250 carry out the rolling motion at the same time, the driving shafts carry out the rolling motion in the opposite direction to each other, so that the loading and unloading mat 100 can be pulled flatways.

In the meantime, after the loading and unloading mat 100 forms the slope of a predetermined inclination, the remaining loads naturally slide down along the slope of the loading and unloading mat 100.

In a case that the two driving shafts are used at the same time, the loading and unloading device can control the loading and unloading mat 100 at a faster speed than the loading and unloading device shown in FIG. 1.

Figure 4:
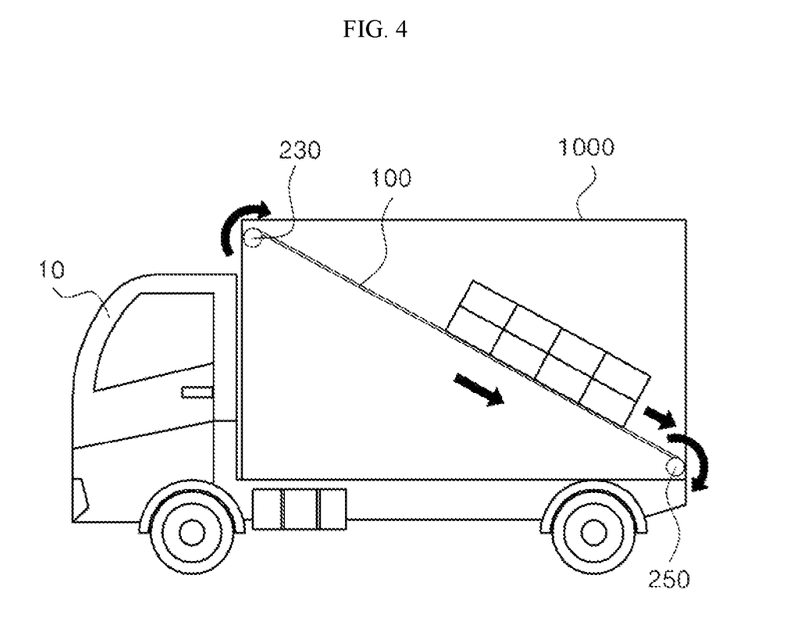
FIG. 4 is a view showing a state where loads are moved using the loading and unloading device of FIG. 3.

FIG. 4 shows a state where the loads are unloaded utilizing the loading and unloading device having the two driving shafts.

Referring to FIG. 4, the loading and unloading device according to the present invention can convey the loading and unloading mat 100 by operating the first driving shaft 230 and the second driving shaft 250 in the same direction after the loading and unloading mat 100 forms the slope at a predetermined angle.

The loads of the loading and unloading device shown in FIG. 2 are moved in such a way as to slide down along the slope formed by the loading and unloading mat 100, but the loading and unloading device shown in FIG. 4 conveys the loading and unloading mat 100 using the two driving shafts. Therefore, the loading and unloading device shown in FIG. 4 can move the loads more easily. Particularly, as shown in FIG. 4, in the case that the loading and unloading mat 100 is conveyed, because the probability that the loads roll irregularly or deviate from the mat is reduced, the loading and unloading device shown in FIG. 4 can move the loads more easily than the loading and unloading device shown in FIG. 2.

In the meantime, the two driving shafts can be utilized also when the loads are loaded.

That is, in the case that the two driving shafts are operated in the opposite direction to the case that the loads are unloaded, the loads can be easily loaded on the loading and unloading mat 100 because the loading and unloading mat 100 is conveyed in the inward direction of the carrying box from the entrance of the carrying box 100.

Figure 6:
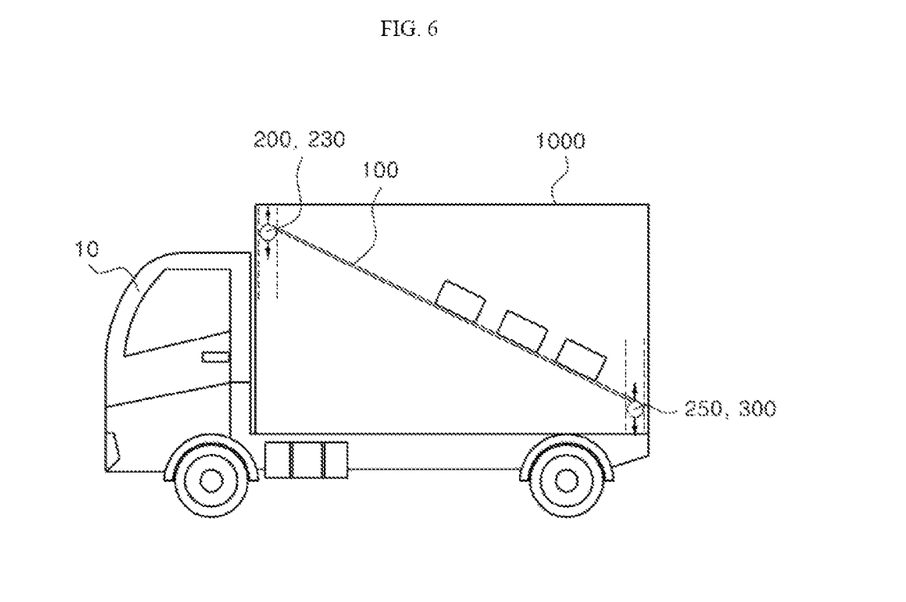
FIG. 6 is a view showing a state where a height of a driving shaft or a fixed shaft disposed inside the carrying box is controlled.

Meanwhile, also the loading and unloading device shown in FIG. 3 or FIG. 4 can control the height of the first driving shaft 230 or the second driving shaft 250, and FIG. 6 shows the state where the height of the first driving shaft 230 or the second driving shaft 250 is controlled.

Figure 5:
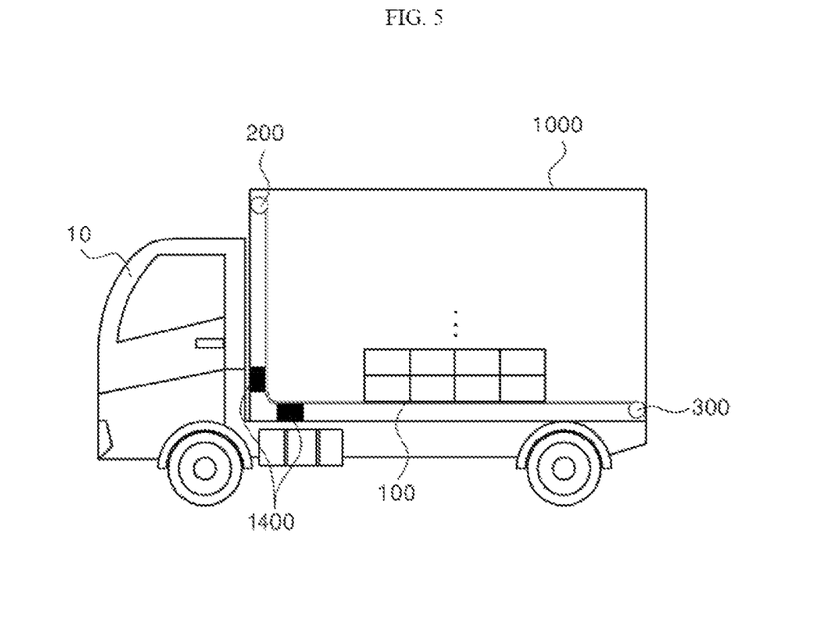
FIG. 5 is a view showing an adhesive pad for adhering a loading and unloading mat onto a carrying box.

FIG. 5 is a view for describing an adhesive pad of the loading and unloading device according to the present invention.

The adhesive pad 1400 is to attach the loading and unloading mat 100 onto the inner wall of the carrying box 1000. Preferably, the adhesive pad 1400 is disposed on the surface of the inner wall of the carrying box 1000 and some of the surface of the loading and unloading mat 100 is adhered onto the adhesive pad 1400, so that the loading and unloading mat 100 can be fixed and attached to the inner wall of the carrying box 1000. In this case, the adhesive pad 1400 is made of an adhesive material in consideration of the material of the loading and unloading mat 100 so that the surface of the loading and unloading mat 100 can be directly adhered to the adhesive pad 1400.

Alternatively, two adhesive sides of the adhesive pad 1400 are respectively disposed on the surface of the inner wall of the carrying box 1000 and the surface of the loading and unloading mat 100, so that the loading and unloading mat 100 can be in close contact with the inner wall of the carrying box 1000.

In other words, one side of the adhesive pad 1400 is disposed on some of the surface of the inner wall of the carrying box 1000 and the other side of the adhesive pad 1400 is disposed on the surface of the loading and unloading mat 100, and then, the two sides of the adhesive pad 1400 are adhered to each other, so that the loading and unloading mat 100 can be in close contact with the surface of the inner wall of the carrying box 1000.

Meanwhile, the adhesive pad 1400 must have adhesive power as strong as the adhesive pad 1400 can come unstuck by the power that the driving shaft rolls up the loading and unloading mat 100, and preferably, the adhesive pad 1400 is made using adhesive cloth, such as Velcro tapes.

FIG. 6 shows a state where the driving shaft or the fixed shaft is controlled in height as occasion demands.

Referring to FIG. 6, the driving shaft or the fixed shaft described in the first preferred embodiment or the first driving shaft and the second driving shaft described in the second preferred embodiment can be controlled in their height as occasion demands. For instance, in a case that the shaft is moved along the guide rail mounted on the surface of the inner wall of the carrying box 1000, the user can control the height of the driving shaft or the fixed shaft or the first driving shaft and the second driving shaft according to weight and volume of the loads, inclination of a road surface and the height of the conveyer 500. When the height of the shaft is controlled, the degree of inclination of the loading and unloading mat 100 can be controlled, so that the user can convey the loads more safely and rapidly.

Figure 7:
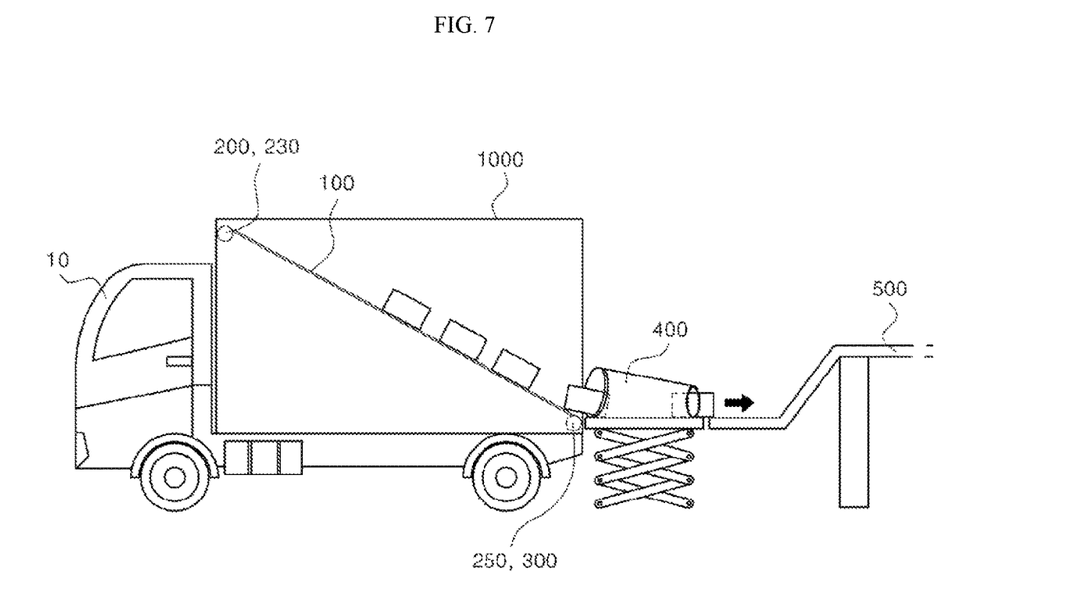
FIG. 7 is a view showing a linkage part for connecting an entrance of the carrying box and an external conveyer with each other.

FIG. 7 is a view for explaining a linkage part of the loading and unloading device according to the present invention.

Referring to FIG. 7, the loading and unloading device may further include the linkage part 400 for connecting the entrance of the carrying box 1000 and the external conveyer 500 with each other. In this instance, the linkage part 400 gets in contact with the entrance of the carrying box 1000 and can be used as means for extending a moving route of the loads. Alternatively, the linkage part includes extending means whose one end is connectable with the lower side of the rear face of the inner wall of the carrying box 1000, namely, the entrance of the carrying box 1000, so that the other end is connected with the conveyer 500.

The linkage part may be connected with the unloading device as an independent device in such a way that one end of the linkage part is connected with the fixed shaft or the driving shaft mounted at the lower side of the rear face of the carrying box 1000, or may be formed integrally with the carrying box 1000.

Additionally, the linkage part 400 may include driving means to move the loads received from the loading and unloading device, and in detail, makes the loads move in link with the conveyer 500 using a conveyer belt.

Meanwhile, it should be understood that the method that the linkage part 400 connects the carrying box 1000 and the conveyer 500 with each other is not limited to the above-mentioned method as long as the extension route to move the loads from the carrying box 1000 to the conveyer 500 is provided.

In the meantime, the linkage part may further include additional members or may have various forms in order to help movement of the loads in stability.

For instance, in a case that the linkage part further includes a side member disposed on the side of the moving route, it can prevent that the loads deviates aside when moving through the linkage part.

Alternatively, the linkage part may have a form of a hopper to make the loads moving along the slope of the mat 100 move on a correct route without deviation. A hopper means a funnel-shaped object whose one mouth is bigger than the other mouth. In a case that the hopper-shaped linkage part is connected to the entrance of the carrying box 1000, it can considerably reduce an accident that the loads are deviated from the moving route.

While the present invention has been particularly shown and described with reference to preferred embodiments and applicable examples thereof, it should be understood by those of ordinary skill in the art that the present invention is not limited to the particular embodiments and applicable examples and various changes and modifications in form and details may be made therein without departing from the spirit and scope of the present invention as defined by the following claims. It should be also understood by those of ordinary skill in the art that the changes and modifications should not be understood discriminately from the technical idea or prospect of the present invention.

The invention claimed is:

1. A device for loading and unloading loads comprising:
   a driving shaft disposed on one of an inner wall of an upper part of a front face and a lower part of a rear face of a carrying box, connected with an end of a loading and unloading mat, and configured to carry out a rolling motion; and
   a fixing shaft disposed on the different position from the driving shaft among the inner wall of the lower part of the rear face and the upper part of the front face of the carrying box, connected with the other end of the loading and unloading mat, and configured to fix the other end of the loading and unloading mat when the mat is rolled in by the rolling motion of the driving shaft,
   wherein the loading and unloading mat is configured to form a slope depending on the rolling motion of the driving shaft,
   wherein the driving shaft includes a sensor configured to sense the end of the loading and unloading mat, and
   wherein the driving shaft stops the rolling motion when the sensor senses the end of the loading and unloading mat during the rolling motion.

2. The device for loading and unloading loads according to claim 1, wherein the driving shaft or the fixing shaft is controlled in its height.

3. The device for loading and unloading loads according to claim 1, wherein the loading and unloading mat is configured to form a slope or get in contact with at least one of the front face and the rear face of the inner wall of the carrying box depending on the rolling motion of the driving shaft.

4. The device for loading and unloading loads according to claim 1, wherein the loading and unloading mat includes a plurality of protrusions formed on the surface thereof.

5. The device for loading and unloading loads according to claim 1, further comprising:
- a linkage part having one end connected with the lower part of the rear face of the carrying box and the other end configured to be connected with an external conveyer.

6. A device for loading and unloading loads comprising:
- a first driving shaft disposed on an inner wall of an upper part of a front face of a carrying box, connected with an end of a loading and unloading mat, and configured to carry out a rolling motion; and
- a second driving shaft which is disposed on an inner wall of a lower part of a rear face of the carrying box, connected with the other end of the loading and unloading mat, and configured to carry out a rolling motion,
- wherein the loading and unloading mat is configured to form a slope depending on the rolling motion of the first and second driving shafts,
- wherein at least one of the first and second driving shafts includes a sensor configured to sense the end of the loading and unloading mat, and
- wherein the driving shaft stops the rolling motion when the sensor senses the end of the loading and unloading mat during the rolling motion.

7. The device for loading and unloading loads according to claim 6, wherein the first driving shaft and the second driving shaft are configured to carry out the rolling motions in the same direction to convey the loading and unloading mat when the loading and unloading mat forms the slope.

8. The device for loading and unloading loads according to claim 6, wherein the first driving shaft or the second driving shaft is controllable in its height.

9. The device for loading and unloading loads according to claim 6, wherein the loading and unloading mat is configured to form a slope or get in contact with at least one of the front face and the rear face of the inner wall of the carrying box depending on the rolling motion of the driving shaft.

10. The device for loading and unloading loads according to claim 9, further comprising:
- an adhesive pad disposed on at least one of the front face and the rear face of the inner wall of the carrying box, and adhered with a bottom face of the loading and unloading mat when the loading and unloading mat gets in contact with at least one of the front face and the rear face of the inner wall of the carrying box.

11. The device for loading and unloading loads according to claim 6, wherein the loading and unloading mat includes a plurality of protrusions formed on the surface thereof.

12. The device for loading and unloading loads according to claim 6, further comprising:
- a linkage part having one end connected with the lower part of the rear face of the carrying box and the other end configured to be connected with an external conveyer.

* * * * *